J. MACNAB AND G. H. SMITH.
INTERCONNECTED CLUTCH AND GEAR SHIFT FOR LATHES AND OTHER MACHINE TOOLS.
APPLICATION FILED NOV. 20, 1918.
1,342,126.
Patented June 1, 1920.
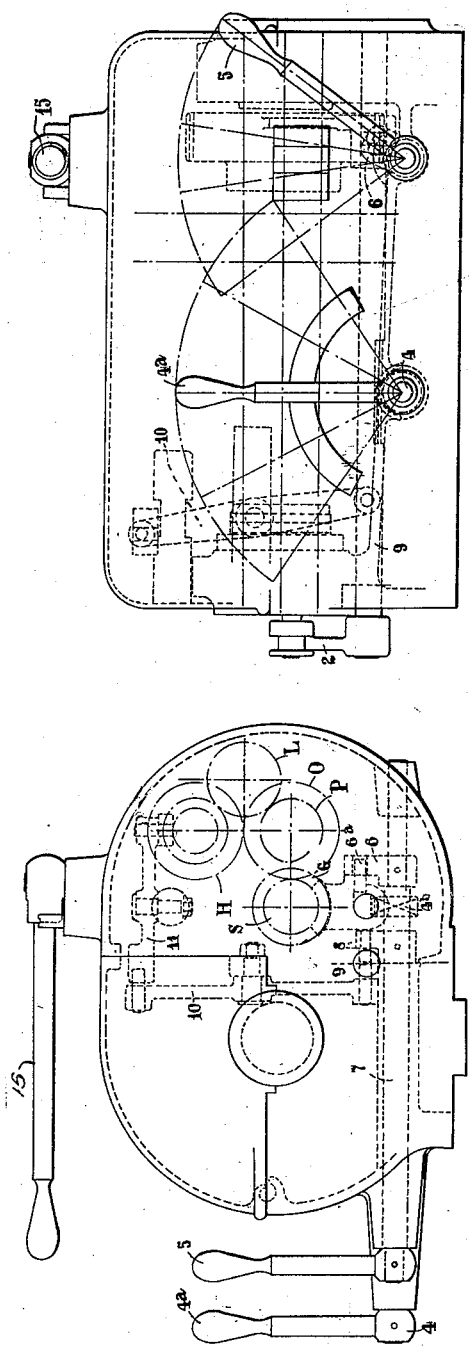
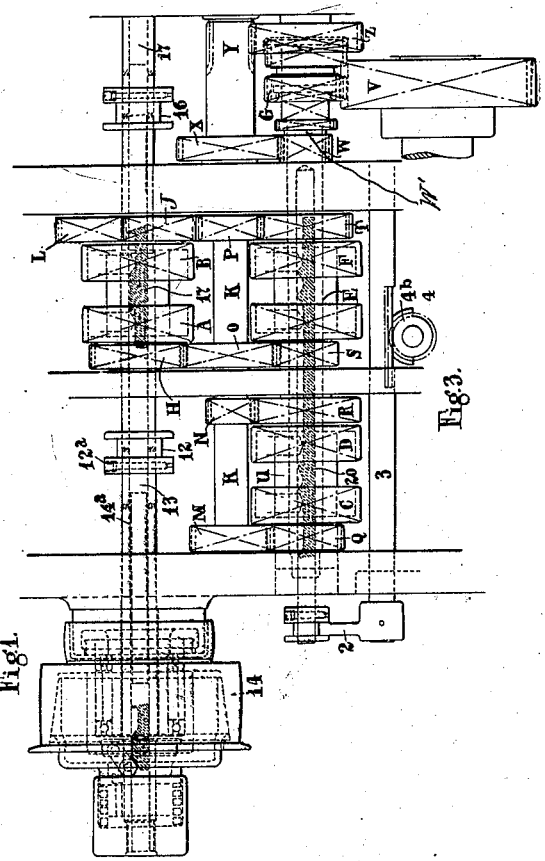
INVENTORS
J. Macnab, G. H. Smith.
BY Herbert R. Kerslake
ATTORNEY

UNITED STATES PATENT OFFICE.

JOSEPH MACNAB AND GEORGE HARRY SMITH, OF BREDBURY, NEAR STOCKPORT, ENGLAND.

INTERCONNECTED CLUTCH AND GEAR-SHIFT FOR LATHES AND OTHER MACHINE-TOOLS.

1,342,126.  Specification of Letters Patent.  Patented June 1, 1920.

Application filed November 20, 1918. Serial No. 263,290.

*To all whom it may concern:*

Be it known that we, JOSEPH MACNAB and GEORGE HARRY SMITH, subjects of the King of Great Britain and Ireland, and residents of Bredbury, near Stockport, in the county of Chester, England, have invented certain new and useful Improvements in Interconnected Clutches and Gear-Shifts for Lathes and other Machine-Tools, of which the following is a specification.

This invention relates to multi-gear headstocks of lathes and other machine tools.

The present invention comprises a multi-gear head stock in which all the high speed gears are reversible and are brought into action by friction clutches, the final or slow speed-drive to the lathe or like spindle gear being through a sliding gear type of clutch interconnected with a clutch for the main driving pulley so that the latter clutch is always put out-of-service before the sliding gear clutch is brought into action.

Referring to the accompanying explanatory drawings:—

Figure 1 is an end elevation and Fig. 2 a front elevation of a multi-gear headstock constructed and arranged in one convenient form in accordance with this invention.

Fig. 3 is a lay-out of the gears within the headstock.

The same reference letters in the different views indicate the same parts.

The belt pulley 14 by which the headstock is driven is adapted to be clutched to its shaft 14$^a$ by a friction clutch of any suitable construction, operated by the sliding rod 13 disposed within the spindle 14$^a$ and actuated from the sleeve 12 by a pin 12$^a$ passing through the rod 13 and moving in a slot in the spindle 14$^a$. The latter carries two clutches A B, one driving the gear wheel H and the other the gear wheel J. The two clutches A, B are actuated by a rod 17 connected to a sliding collar 16, similar to the collar 12. The gear wheel H drives the spindle K direct by the gear wheel O, while the gear wheel J can drive the said spindle through the intermediate gear wheel L, which gears with the wheel P as shown at Fig. 1. The shaft K also has keyed thereon two pinions M, N. Each of the pinions M, N, O, P is adapted to drive the spindle U through gear wheels and clutches Q, C; R, D; S, E and T, F respectively, the clutches C, D, E, F being controlled by a rod 20 actuated from a rod 3 by a connecting piece 2. Only one of the clutches C, D, E, F is in operation at any one time. The shaft U has a wheel W keyed thereon for the purpose of driving the lathe or like spindle gear V through the back gear wheels X, Y, Z and the sliding twin gear wheel G, the said wheel Z being provided with internal teeth for engaging, as shown at Fig. 3, the right hand portion of G. When it is required to drive the gear V direct from the shaft U, the sliding wheel G is moved along the shaft so that the right hand portion of G is withdrawn from engagement with the internal teeth of the wheel Z, and internal teeth formed in the left hand portion of G are put into engagement with the extension W' forming part of the wheel W; the back gear is then inoperative.

The control of the clutches C, D, E, F is effected by the handle 4$^a$ on the spindle 4 carrying the pinion 4$^b$ engaging the racked portion of the rod 3.

The clutches A and B are controlled by the hand lever 15 which operates the sliding collar 16.

The control mechanism for the sliding gear G is interconnected with the operating mechanism of the clutch of the pulley 14 as follows:—The handle 5 (Figs. 1 and 2) is mounted upon the spindle 7 carrying two crank arms 6 and 8, the one 6 having an elongated slot therein so that a predetermined amount of idle movement may occur between the period of actuation of the handle 5 and the period of actuation of the pin 6$^a$ upon the member by which the sliding gear G is moved for engaging either the wheel W or the wheel Z. The arm 8 actuates a rod 9 (see Fig. 2) which engages one end of a lever 10, the other end of which actuates a lever 11 engaging the sliding collar 12. With this arrangement, and with the parts in the positions shown in Fig. 3, when it is desired to cause the sliding gear wheel G to engage the wheel W, the handle 5 is moved. During the first part of this movement, the arm 8 puts the friction clutch of the pulley 14 out of action while the arm 6 has an idle movement. Then the said arm moves the pin 6$^a$ and the wheel G is slid toward the gear W. Finally the wheel G is caused to engage the gear W at the same time that the clutch of the pulley 14 is brought into action.

It will thus be seen that while the drive to the slow speed gear V is always through the sliding gear G, that gear is never brought into driving connection with its mating wheels W and Z without the driving connection of the pulley 14 having been previously rendered inoperative.

The drive herein described gives eight speed changes both in a forward and in the reverse direction.

We do not limit ourselves to any particular form or arrangement of clutch, nor to any particular disposition of the control handles, but may vary the same to suit requirements.

Having now described our invention what we claim as new and desire to secure by Letters Patent is:—

1. In an interconnected clutch and gear shift, the combination comprising a driving shaft, a pulley thereon, a clutch to connect the pulley to the shaft, a driven gear (V), slidable gears adapted to mesh with the gear V, transmission means between the shaft and slidable gears, means for sliding said gears, means for controlling said clutch and interconnecting means between the gear sliding and clutch controlling means, as set forth.

2. In an interconnected clutch and gear shift, the combination comprising a driving shaft, a pulley thereon, a clutch to connect the pulley to the shaft, a driven gear (V), slidable gears adapted to mesh with the gear V, transmission means between the shaft and slidable gears, means for sliding said gears, means for controlling said clutch, an operating handle, and interconnected transmission means between the gear sliding and clutch controlling means and the said handle such that the said slidable gears are never brought into driving connection prior to the disconnection of the said pulley on the driving shaft, as set forth.

In testimony whereof we have signed our names to this specification.

JOSEPH MACNAB.
GEORGE HARRY SMITH